(12) United States Patent
Hoo (10) Patent No.: US 7,433,432 B2
(45) Date of Patent: Oct. 7, 2008

(54) ADAPTIVE DETECTOR FOR MULTIPLE-DATA-PATH SYSTEMS

(75) Inventor: Min Chuin Hoo, Palo Alto, CA (US)

(73) Assignee: Broadcom Corporation, Irvine, CA (US)

( * ) Notice: Subject to any disclaimer, the term of this patent is extended or adjusted under 35 U.S.C. 154(b) by 633 days.

(21) Appl. No.: 11/027,102

(22) Filed: Dec. 31, 2004

(65) Prior Publication Data

US 2006/0148506 A1 Jul. 6, 2006

(51) Int. Cl.
H04L 1/02 (2006.01)
(52) U.S. Cl. .................. 375/347; 375/267; 375/350; 370/203; 370/319; 370/464; 455/59; 455/67.11; 455/226.1
(58) Field of Classification Search .................. 375/140, 375/141, 147, 260–262, 267, 340, 347, 350; 370/203, 319–321, 464, 465, 480; 455/59, 455/67.11, 67.13, 134, 135, 226.1–226.3
See application file for complete search history.

(56) References Cited

U.S. PATENT DOCUMENTS

| | | | | |
|---|---|---|---|---|
| 5,363,413 | A * | 11/1994 | Vos | 375/340 |
| 6,151,487 | A | 11/2000 | Kim et al. | |
| 7,187,646 | B2 * | 3/2007 | Schramm | 370/206 |
| 7,197,084 | B2 * | 3/2007 | Ketchum et al. | 375/296 |
| 7,212,569 | B1 * | 5/2007 | Clark | 375/233 |
| 2004/0242179 | A1 | 12/2004 | Onggosanusi et al. | |
| 2006/0193391 | A1 * | 8/2006 | Borran et al. | |

FOREIGN PATENT DOCUMENTS

WO WO 01/11790 2/2001

OTHER PUBLICATIONS

B. Steingrimsson et al., "Quasi-ML Detectors with Soft Output and Low Complexity for PSK Modulated MIMO Channels," Signal Processing Advances in Wireless Communications, 2003, SPAWC, 4th IEEE Workshop on Time, Italy, Jun. 15-18, 2003.
European Search Report for Application No. 05015352.7-2411, Jul. 2006.
Jacky Ho-Yin Fan et al., "Near Maximum Likelihood Detection Schemes for Wireless MIMO Systems," IEEE Transactions on Wireless Communications, vol. 3, No. 5, Sep. 2004.
Huaiyu Dai et al., "Multiuser Detection for Interference-Limited MIMO Systems," VTC Spring 2002, IEEE 55th Vehicular Technology Conference Proceedings, NY NY May 6-9, 2002.

* cited by examiner

*Primary Examiner*—Dac V Ha
(74) *Attorney, Agent, or Firm*—Garlick Harrison & Markison (57) ABSTRACT

An adaptive, reduced-complexity soft-output maximum-likelihood detector that is operable to process data by adaptively selecting a processing scheme based on a determination of signal quality. The signal quality is derived as a function of the noise, the modulation format, the channel (the communication environment), the transmit signal power and the receive signal power. If the signal quality is low, the signal is processed using a maximum likelihood detector. If, however, the signal quality is high, a simpler sub-optimal detector is used. By estimating the signal quality and choosing an appropriate detection method, the present invention ensures accurate detection of incoming data signals in a MIMO communication system while maintaining the highest possible processing speed.

16 Claims, 6 Drawing Sheets

ADAPTIVE DETECTOR FOR MULTIPLE-DATA-PATH SYSTEMS

BACKGROUND OF THE INVENTION

1. Field of the Invention

The present invention is directed in general to wireless communication systems. In one aspect, the present invention relates to a method and system for improving the performance of wireless transceivers by providing an improved detector for multiple-antenna systems.

2. Description of the Related Art

Modern communication systems support wireless and wire-lined communications between a wide variety of wireless and/or wire-lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth (BT), advanced mobile phone services (AMPS), digital AMPS, global system for mobile communications (GSM), code division multiple access (CDMA), local multi-point distribution systems (LMDS), multi-channel-multi-point distribution systems (MMDS) and/or variations thereof.

Depending on the type of wireless communication system, a wireless communication device (such as a cellular telephone, two-way radio, personal digital assistant (PDA), personal computer (PC), laptop computer, home entertainment equipment, etc.) communicates directly or indirectly with other wireless communication devices. For direct communications (also known as point-to-point communications), the participating direct communications (also known as point-to-point communications), the participating wireless communication devices tune their receivers and transmitters to the same channel or channels (e.g., one of the plurality of radio frequency (RF) carriers of the wireless communication system) and communicate over the tuned channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switched telephone network, via the Internet, and/or via some other wide area network.

Wireless communication devices typically communicate with one another using a radio transceiver (i.e., receiver and transmitter) that may be incorporated in, or coupled to, the wireless communication device. The transmitter typically includes a data modulation stage, one or more intermediate frequency stages and a power amplifier. The data modulation stage converts raw data into baseband signals in accordance with a particular wireless communication standard. The intermediate frequency stages mix the baseband signals with one or more local oscillations to produce RF signals. The power amplifier amplifies the RF signals prior to transmission via an antenna.

The receiver is typically coupled to an antenna and includes a low noise amplifier, one or more intermediate frequency stages, a filtering stage and a data recovery stage. The low noise amplifier receives inbound RF signals via the antenna and amplifies them. The intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

In wireless communication systems utilizing the various 802.11 standards, the allowable bandwidth is set be standard-setting associations and governmental agencies. To achieve higher data throughput, many later generation wireless systems, such as those based on the 802.11n standard use Multiple Input Multiple Output (MIMO) antenna systems. MIMO systems use multiple transmit antennas to transmit multiple data streams in the same frequency spectrum and take advantage of multipath channels with a plurality of receive antennas being used to recover the information transmitted over the various data streams. Thus in a MIMO system, information is transmitted and received simultaneously using multiple transmit and receive antennas. In such a system, each pair of transmit and receive antennas defines a signal path from the transmitter to the receiver.

MIMO technology has been adopted by the Institute for Electrical and Electronic Engineers (IEEE) for the next generation wireless local area network (WLAN) to provide a throughput of at least one hundred Mbps. Transmission protocols and standards for such a high throughput (WLAN) are embodied in a standard referred to as 802.11n. Since 802.11n is a MIMO extension of current WLAN standards, such as 802.11a and 802.11g, 802.11n will also be based on the transmission scheme referred to as orthogonal frequency division multiplexing (OFDM).

A MIMO system can provide two types of gain: (1) diversity gain, and (2) spatial multiplexing gain. Diversity gain is realized when signals carrying the first information are sent via different paths. This multipath transmission increases the robustness of transmission or the reliability of reception. Spatial multiplexing gain is realized when signals carrying independent information are sent in parallel via different paths. This increases the length throughput or the data rate of the wireless communication system.

In MIMO systems, there is a need to obtain an estimate of the transmitted signal with a high degree of accuracy. However, there is an inherent tradeoff between maximum accuracy and the speed of processing the signal. The optimum detector is a maximum-likelihood detector. Given the received symbol vector y, the maximum-likelihood detector searches over all possible transmitted signals/vectors $x_j$ for the transmit vector that maximizes the conditional probability $Pr\{x_j/y\}$, thereby minimizing the probability of decoding error at the receiver. Since communication systems will employ some form of coding, the output of the maximum-likelihood detector should be a measure of reliability of each transmitted bit. These reliabilities are also known as soft decisions. However, the maximum-likelihood detector involves searching over all the possible combinations of transmit symbols. For a system with multiple transmit antennas, the complexity grows exponentially with the number of transmit antennas. Fortunately, when the MIMO channels are well-conditioned, suboptimal equalization-based detectors are likely to be as good as the optimum maximum-likelihood detector. In other words, the highly complex maximum-likelihood detector is only necessary when the MIMO channels are ill-conditioned. For MIMO channels that are neither well-conditioned nor ill-conditioned, a reduced-complexity maximum-likelihood detector can be used. A reduced complexity soft-output maximum likelihood detector is described in U.S. patent application Ser. No. 11/027,106, filed on Dec. 31, 2004, by inventor Min Chuin Hoo, entitled "Reduced Complexity Detector for Multiple-Antenna Systems," which by this reference is incorporated herein for all purposes.

In view of the foregoing, it is apparent that there is a need for an adaptive detector that exploits the fact that detectors of different complexities work best in different conditions. The purpose of the adaptive detector is to adapt the choice of the appropriate detector according to some signal quality measure and still give comparable performance to the optimum maximum-likelihood detector.

SUMMARY OF THE INVENTION

The method and apparatus of the present invention provides an adaptive, reduced-complexity soft-output maximum-likelihood detector. In the present invention, the soft-output detector adaptively selects a processing scheme based on a determination of signal quality. The signal quality is derived as a function of the noise, the modulation format, the channel (the communication environment), the transmit signal power and the receive signal power. If the signal quality is low, the signal is processed using a maximum likelihood detector. If, however, the signal quality is high, a simpler sub-optimal detector is used. By estimating the signal quality and choosing an appropriate detection method, the present invention ensures accurate detection of incoming data signals in a MIMO communication system while maintaining the highest possible processing speed.

In one embodiment of the adaptive, reduced-complexity soft-output maximum-likelihood detector of the present invention, a simple equalization-based detector is used to separate the transmit streams at the receiver in order to a closed-form representation of the signal quality of each transmit stream. The signal quality of each transmit stream is a function of the signal-to-noise ratio and the modulation format. In an embodiment of the invention the measurement is based on $d/2\sigma$ where d is the minimum distance between 2 constellation symbols and $\sigma^2$ is the noise power after linear equalization. If the transmit energy is kept constant, the bigger the constellation size, the smaller d is. The larger $d/2\sigma$ is, the higher the signal quality, and the less complex the detection method needs to be. In a multiple-antenna system, it is necessary to compute $d/2\sigma$ for each transmit stream.

In another embodiment of the adaptive, reduced-complexity soft-output maximum-likelihood detector of the present invention, the signal quality measure can be derived from processing the channel information. The signal quality measure can be but not limited to some function of the singular values of the channel.

The present invention provides a high degree of signal detection accuracy while maintaining high processing speeds. The method and apparatus of the present invention can be applied to any communication system with multiple transmit streams.

BRIEF DESCRIPTION OF THE DRAWINGS

The present invention may be better understood, and its numerous objects, features and advantages made apparent to those skilled in the art by referencing the accompanying drawing.

DETAILED DESCRIPTION

A method and apparatus for an improved wireless communication system is described. While various details are set forth in the following description, it will be appreciated that the present invention may be practiced without these specific details. For example, selected aspects are shown in block diagram form, rather than in detail, in order to avoid obscuring the present invention. Some portions of the detailed descriptions provided herein are presented in terms of algorithms or operations on data within a computer memory. Such descriptions and representations are used by those skilled in the field of communication systems to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated otherwise as apparent from the following discussion, it is appreciated that throughout the description, discussions using terms such as processing, computing, calculating, determining, displaying or the like, refer to the action and processes of a computer system, or similar electronic computing device, that manipulates and/or transforms data represented as physical, electronic and/or magnetic quantities within the computer system's registers and memories into other data similarly represented as physical quantities within the computer system memories or registers or other such information storage, transmission or display devices.

Figure 1:
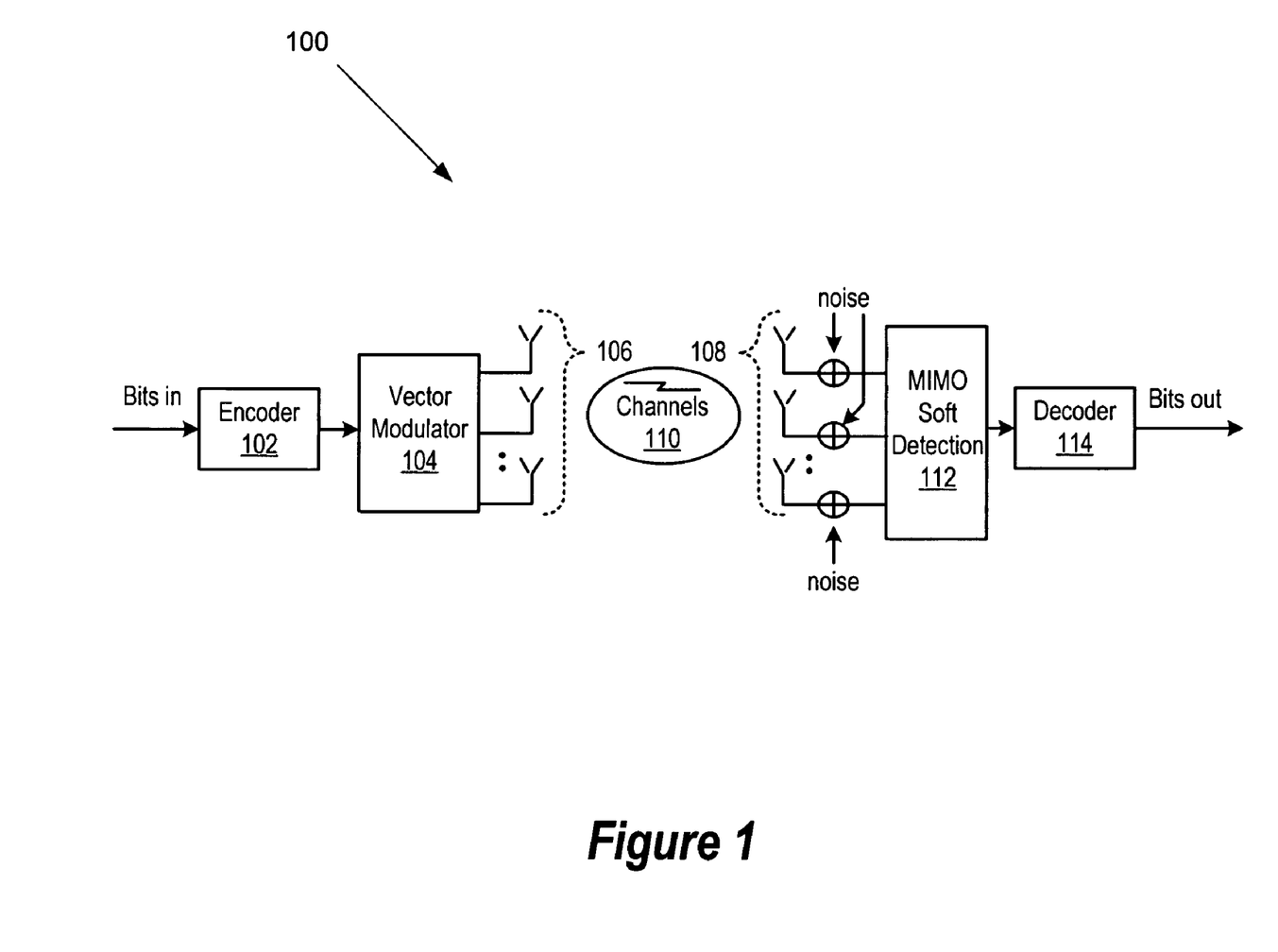
FIG. 1 is an illustration of the generalized functional components for implementing a MIMO system with a plurality of transmit antennas and a plurality of receive antennas.

FIG. 1 is an illustration of the functional components of a generalized communication system 100 for implementing a MIMO system with two transmit antennas and two receive antennas. A bit stream is received by encoder 102 which generates an encoded input for the vector modulator 104. A plurality of antennas 106 and 108 are operable to communicate over a plurality of communication channels 110, thereby defining a plurality of MIMO communication channels. As will be understood by those of skill in the art, the data received by antennas 108 will contain noise. The MIMO soft detection module 112 is operable to process the incoming data to provide "soft" decisions regarding the received data. These soft decisions are used by the detector 114 to generate an accurate output bit stream that avoids corruption related to the effects of noise.

Figure 2:
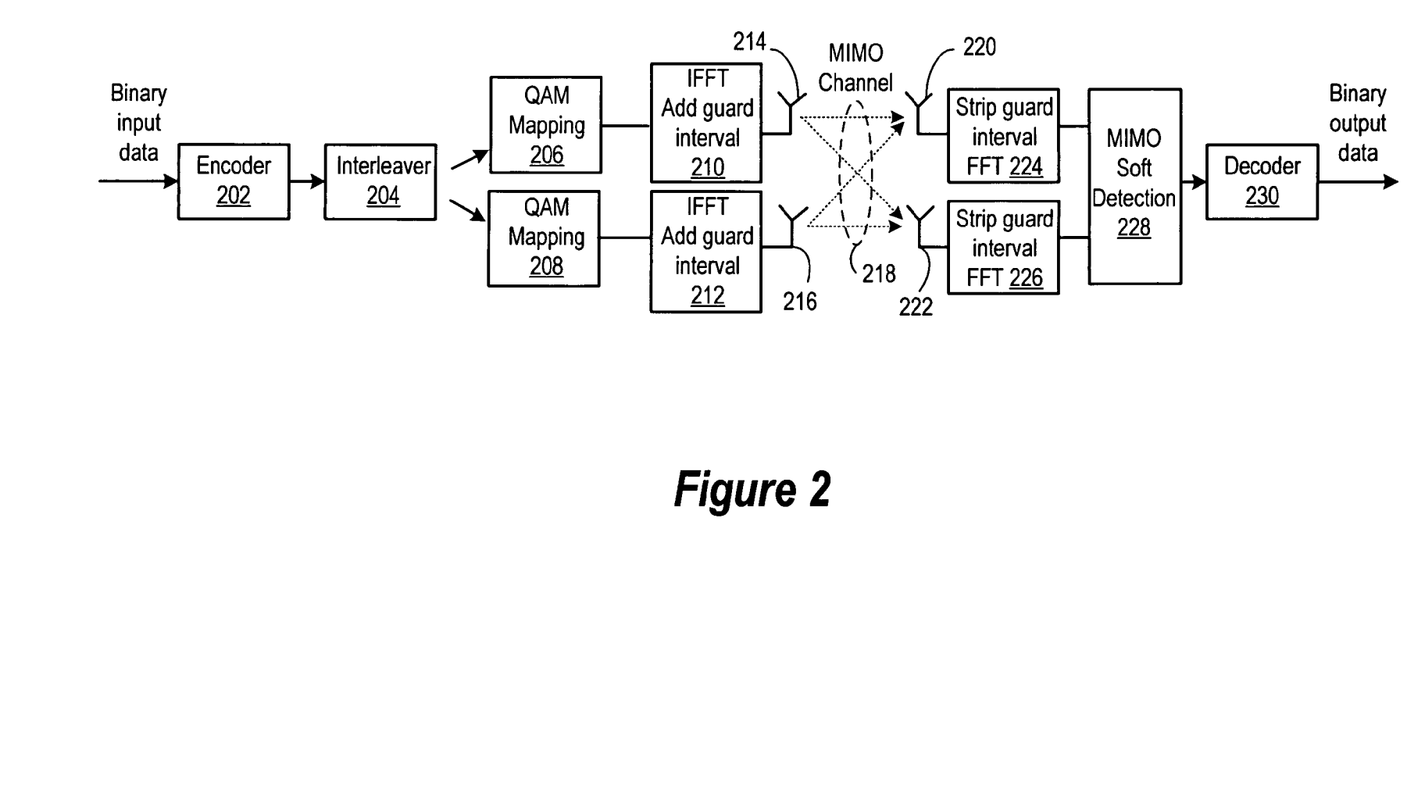
FIG. 2 is an illustration of the generalized functional components for implementing a MIMO system with two transmit antennas and two receive antennas for a system using orthogonal frequency division multiplexing.

FIG. 2 is an illustration of the functional components of a communication system 200 for implementing MIMO communications using OFDM with two transmit antennas and two receive antennas. The illustration in FIG. 2 is operable to binary input data using a MIMO protocol for a WLAN. The MIMO system 200 in FIG. 2 comprises an encoder 202 and an interleaver 204. The output from the interleaver 204 is separated into first and second data streams that are provided to QAM mapping modules 206 and 208. The QAM mapping modules 206 and 208 provide quadrature amplitude modulated data streams that are provided to inverse fast Fourier transform (IFFT) add guard interval modules 210 and 212, respectively. The IFFT add guard interval modules 210 and 212 transmit modulated data streams via antennas 214 and 216. As will be understood by those of skill in the art, the data transmitted by antennas 214 and 216 can be propagated by MIMO multipath channels 218 between the various transmit and receive antennas. The signals received by antennas 220 and 222 are processed by strip guard interval fast Fourier transform (FFT) modules 224 and 226, that generate inputs to the MIMO soft detection module 228. The processed signals from the strip guard interval FFT modules are processed by the MIMO soft detection module 228 and are then provided to the decoder 230 to generate a binary output data stream.

Figure 3A:
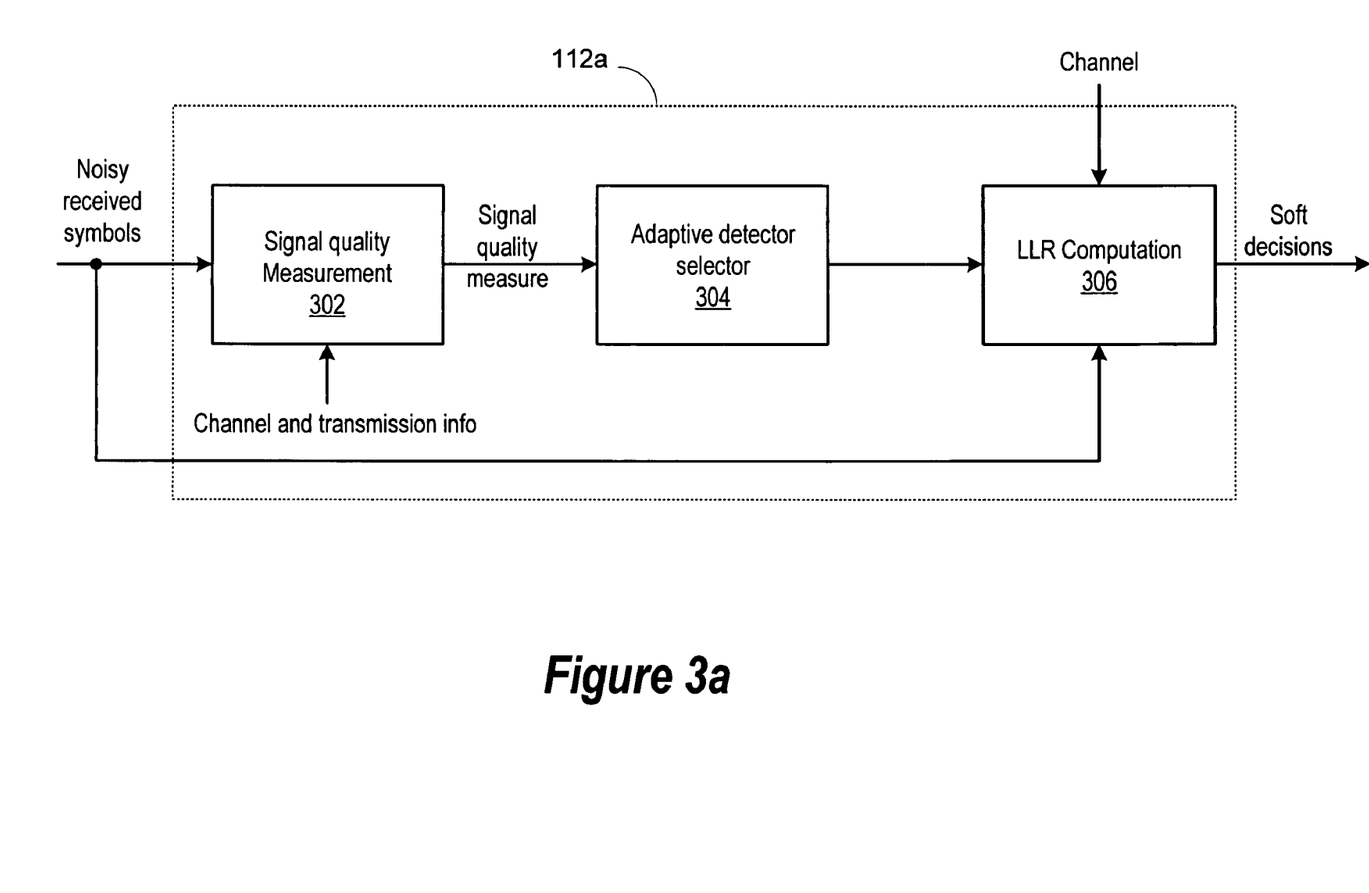
FIG. 3A is a block diagram illustration of the functional components of a first embodiment of a MIMO soft detector in accordance with the present invention.
Figure 3B:
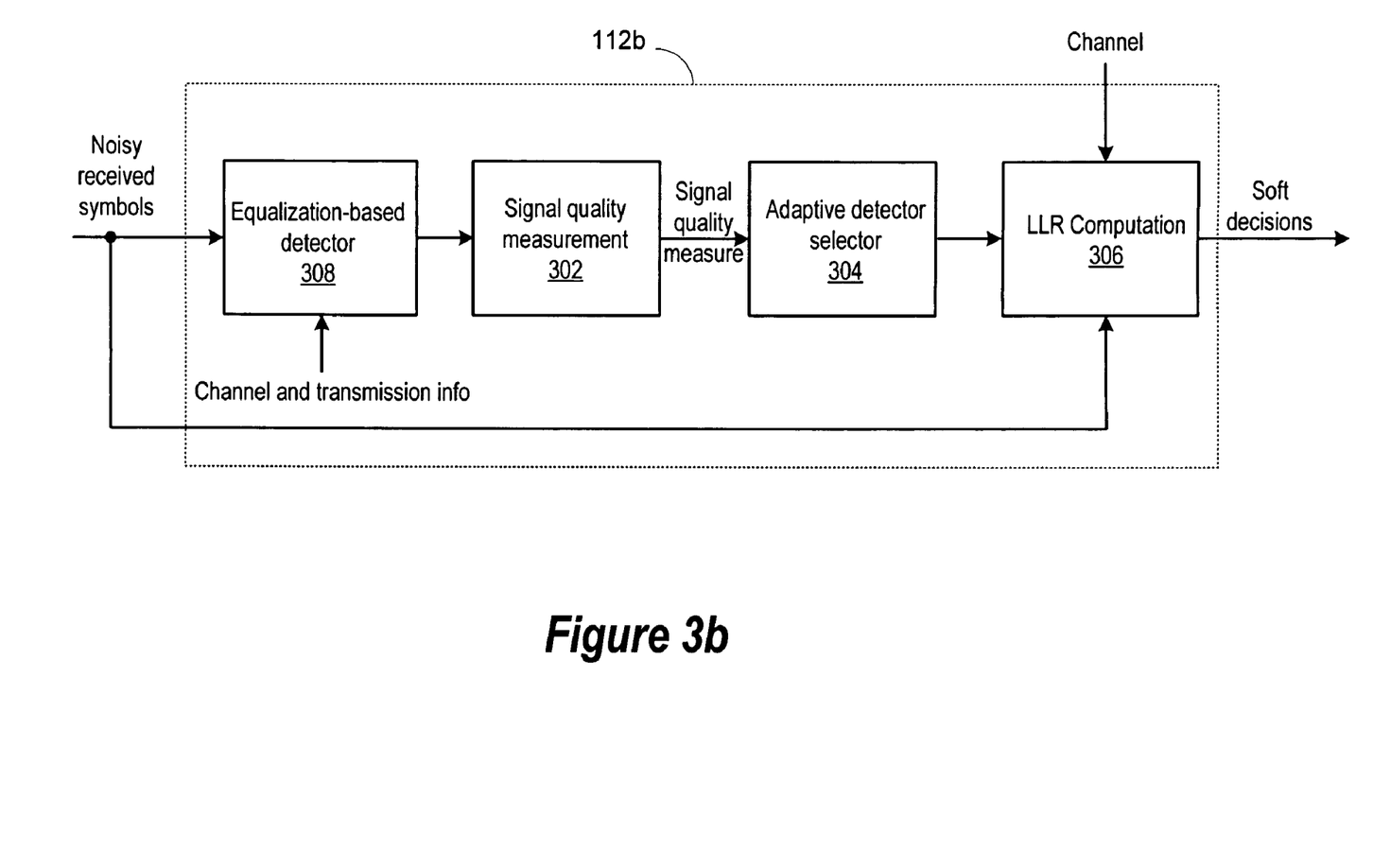
FIG. 3B is a block diagram illustration of the functional components of a second embodiment of a MIMO soft detector in accordance with the present invention.
Figure 3C:
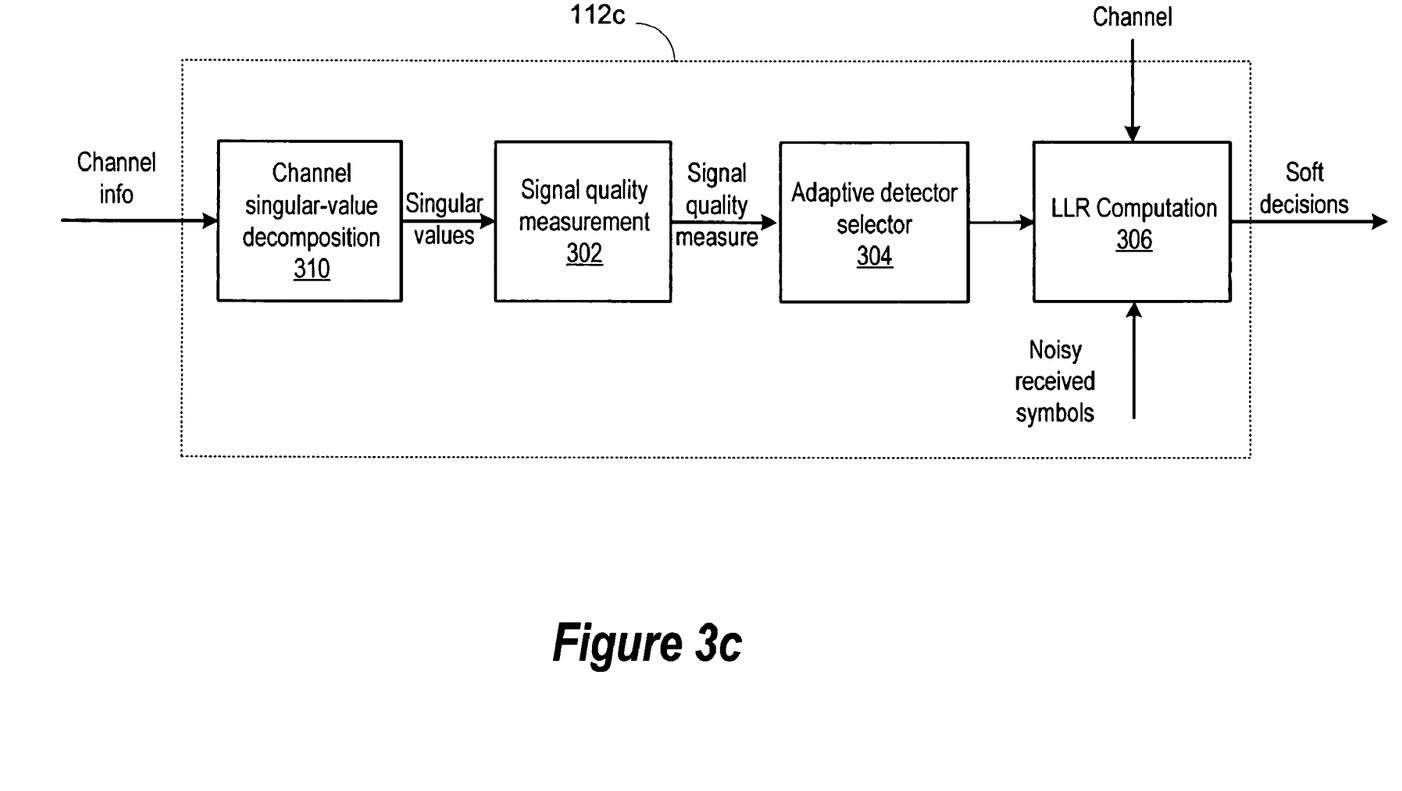
FIG. 3C is a block diagram illustration of the functional components of a third embodiment of a MIMO soft detector in accordance with the present invention.

FIGS. 3a-c illustrate various embodiments of the adaptive MIMO soft-detector 112 of the present invention. In the embodiment of the detector 112a illustrated in FIG. 3a, incoming data, in the form of noisy received symbols, is received along with channel and transmission information by the signal quality measurement module 302, which generates an output signal corresponding to the signal quality measurement. The adaptive detector selector 304 receives the signal quality measurement information and chooses an appropriate detection method, based on the signal quality information, and provides an initial estimate regarding the received symbols to the LLR computation module 306. The initial estimate is used by the LLR computation module 306 to generate a soft decision output to be used by the decoder 114 illustrated in FIG. 1.

In the embodiment of the detector 112b shown in FIG. 3b, the noisy received symbols and channel information is received by an equalization-based detector module 308 that equalizes the incoming data as discussed in greater detail below. The output of the equalization based detector 308 is provided to a signal quality measurement module 302 which generates an output signal corresponding to the signal quality measurement. The signal quality output signal is provided an input to the adaptive detector module selector 304 to provide an initial estimate regarding the received symbols that is used by the LLR computation module 306 to generate soft decisions.

In the embodiment of the detector 112c illustrated in FIG. 2c, channel information is provided to a channel singular value decomposition module 310 that is operable to generate singular values that are used by the signal quality measurement module 302 to generate a signal quality measurement. The adaptive detector selector 304 receives the signal quality measurement information and chooses an appropriate detection method, based on the signal quality information, and provides an initial estimate regarding the received symbols to the LLR computation module 306. The initial estimate is used by the LLR computation module 306 to generate a soft decision output to be used by the decoder 114 illustrated in FIG. 1.

As will be understood by those of skill in the art, a MIMO soft decoder estimates the reliability of each possible decision regarding a received symbol without making an actual decision regarding the symbol. The decoder uses the estimated reliabilities, or soft decisions, provided by the MIMO soft detector to decode the received symbols, thereby generating a decoded binary output data stream.

The method and apparatus of the present invention can be understood by considering the processing of received signals by the MIMO soft detection module 112 in a generalized communication system such as that illustrated in FIG. 1 with $N_t$ transmit antennas and $N_r$ receive antennas. This $N_t \times N_r$ system can be described by the following model:

$$\begin{bmatrix} y_1(n) \\ y_2(n) \\ \vdots \\ y_{Nr}(n) \end{bmatrix} = \begin{bmatrix} H_{11}(n) & H_{12}(n) & \cdots & H_{1Nt}(n) \\ H_{21}(n) & H_{22}(n) & \cdots & H_{2Nt}(n) \\ \vdots & \vdots & \ddots & \vdots \\ H_{Nr1}(n) & H_{Nr2}(n) & \cdots & H_{NrNt}(n) \end{bmatrix} \begin{bmatrix} x_1(n) \\ x_1(n) \\ \vdots \\ x_{Nt}(n) \end{bmatrix} + \begin{bmatrix} N_1(n) \\ N_1(n) \\ \vdots \\ N_{Nt}(n) \end{bmatrix} \quad \text{Eq 1}$$

$$y(n) = H(n)x(n) + N(n) \quad \text{Eq 2}$$

Where: n is the time or frequency index
y is the $N_r \times 1$ receive vector
H is the $N_r \times N_t$ channel matrix
x is the $N_t \times 1$ transmit vector
N is the $N_r \times 1$ noise vector The channel matrix H can be assumed to be static over the duration of interest. Therefore, in the discussion hereinbelow, the time/freq index is omitted and the model becomes $$y = Hx + N \quad \text{Eq 3}$$

In addition, it can be assumed that the channel matrix H is perfectly known at the receiver and that the noise samples $N_i(n)$ are independent complex Gaussian variables with zero mean and variance $\sigma^2$.

From Equation 1, the received signal at antenna j, $y_j(n)$, is a noisy superposition of the $N_t$ transmitted symbols, $x_i(n)$, that are corrupted by the channel matrix H as described by the following equation:

$$y_j = \sum_{i=1}^{N_t} H_{ji} x_i + N_j, \; j = 1, \ldots, N_r \quad \text{Eq 4}$$

Each symbol $x_i$ is mapped from $\log_2(M)$ bits where M is the size of the constellation. For example, if $x_i$ is drawn from a 4-QAM constellation, then each $x_i$ is mapped from 2 bits. In Equation 4, the total number of bits transmitted is $N_t \log_2(M)$ bits. This will hereinafter be denoted as a transmit bit vector $[b_1 \; b_2 \ldots b_L]$ where $L = N_t \log_2(M)$.

As discussed hereinabove, a soft-output maximum-likelihood detector is optimum because it minimizes the probability of incorrect decisions. A soft-output maximum-likelihood detector receives y and searches over all possible transmit symbol vectors x to produce soft information about the likelihood of the transmitted bits $b_l$, $l=1, \ldots, N_t \log_2(M)$ being a 0 or a 1.

The soft information of each $b_1 = 0$ or 1 is in the form of the log-likelihood ratio (LLR) of the a priori probability of $b_1 = 0$ or 1.

For an $N_t \times N_r$ M-QAM system as defined by Equation 3, the vector of $[b_1 \; b_2 \ldots b_L]$ bits where $L = N_t \log_2(M)$ is mapped into $[x_1 x_2 \ldots x_{Nt}]$ symbols and is transmitted. The LLR of bit $b_l$, $l=1, 2, \ldots L$, is:

$$LLR(b_l) = \ln\frac{Pr(b_l = 0|y)}{Pr(b_l = 1|y)} \quad \text{Eq 5}$$

$$= \ln\frac{\sum_{\forall x_j\, s.t.\, b_l=0} Pr(x_j|y)}{\sum_{\forall x_j\, s.t.\, b_l=1} Pr(x_j|y)}$$

where j=1, ... $M^{N_t}$ denotes all possible transmit symbol vectors, y is the received symbol vector.

Applying Bayes' rule, $LLR(b_l)$ can be rewritten as:

$$LLR(b_l) = \ln\frac{\sum_{\forall x_j\, s.t.\, b_l=0} Pr(y|x_j)Pr(x_j)}{\sum_{\forall x_j\, s.t.\, b_l=1} Pr(y|x_j)Pr(x_j)} \quad \text{Eq 6}$$

$$= \ln\frac{\sum_{\forall x_j\, s.t.\, b_l=0} Pr(y|x_j)}{\sum_{\forall x_j\, s.t.\, b_l=1} Pr(y|x_j)}$$

where the last simplification is based on the assumption that $x_j$'s are equi-probable.

Given the channel matrix H, $$LLR(b_l) = \ln\frac{\sum_{\forall x_j\, s.t.\, b_l=0} e^{\left(-\frac{\|y-Hx_j\|^2}{\sigma^2}\right)}}{\sum_{\forall x_j\, s.t.\, b_l=1} e^{\left(-\frac{\|y-Hx_j\|^2}{\sigma^2}\right)}} \quad \text{Eq 7}$$

further simplify by keeping only the largest term in the summation in both the numerator and denominator, $$L\hat{L}R(b_l) = \frac{1}{\sigma^2}\left(\min_{\forall x_j\, s.t.\, b_l=1}\|y-Hx_j\|^2 - \min_{\forall x_j\, s.t.\, b_l=0}\|y-Hx_j\|^2\right), \quad \text{Eq 8}$$

Figure 4:
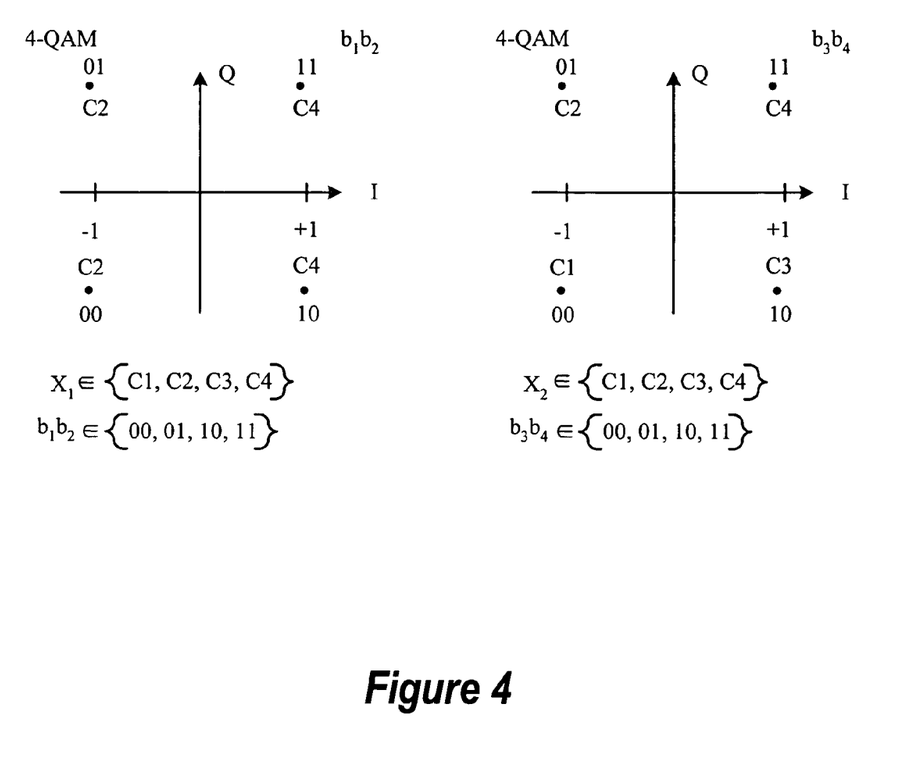
FIG. 4 is an illustration of a 4-QAM constellation of symbols processed by the MIMO soft detector of FIG. 1.

In a 2×2 4-QAM system, the transmitted symbols $x_1$, $x_2$ in Equation 1 are each drawn from a 4-QAM constellation as shown in FIG. 4.

Table 1 lists all the 16 combinations of transmit symbol vectors $[x_1\ x_2]$.

TABLE 1

| j | $x_j = x_1\ x_2$ | $b_1 b_2 b_3 b_4$ |
|---|---|---|
| 1 | C1C1 | 0000 |
| 2 | C1C2 | 0001 |
| 3 | C1C3 | 0010 |
| 4 | C1C4 | 0011 |
| 5 | C2C1 | 0100 |
| 6 | C2C2 | 0101 |
| 7 | C2C3 | 0110 |
| 8 | C2C4 | 0111 |
| 9 | C3C1 | 1000 |

TABLE 1-continued

| j | $x_j = x_1\ x_2$ | $b_1 b_2 b_3 b_4$ |
|---|---|---|
| 10 | C3C2 | 1001 |
| 11 | C3C3 | 1010 |
| 12 | C3C4 | 1011 |
| 13 | C4C1 | 1100 |
| 14 | C4C2 | 1101 |
| 15 | C4C3 | 1110 |
| 16 | C4C4 | 1111 |

C1 = −1 − j
C2 = −1 + j
C3 = 1 − j
C4 = 1 + j

From Equation 8, the approximate LLRs of $b_1$, $b_2$, $b_3$ and $b_4$ can be computed as follows:

$$L\hat{L}R(b_1) = \frac{1}{\sigma^2}\left(\min_{\forall x_j, j=9,\ldots,16}\|y-Hx_j\|^2 - \min_{\forall x_j, j=1,\ldots,8}\|y-Hx_j\|^2\right) \quad \text{Eq 9}$$

$$L\hat{L}R(b_2) = \frac{1}{\sigma^2}\left(\min_{\substack{\forall x_j, j=5,\ldots,8 \\ 13,\ldots,16}}\|y-Hx_j\|^2 - \min_{\substack{\forall x_j, j=1,\ldots,4 \\ 9,\ldots,12}}\|y-Hx_j\|^2\right) \quad \text{Eq 10}$$

$$L\hat{L}R(b_3) = \frac{1}{\sigma^2}\left(\min_{\substack{\forall x_j, j=3,4,7,8 \\ 11,12,15,16}}\|y-Hx_j\|^2 - \min_{\substack{\forall x_j, j=1,2,5,6 \\ 9,10,13,14}}\|y-Hx_j\|^2\right) \quad \text{Eq 11}$$

$$L\hat{L}R(b_4) = \frac{1}{\sigma^2}\left(\min_{\forall x_j, j=even}\|y-Hx_j\|^2 - \min_{\forall x_j, j=odd}\|y-Hx_j\|^2\right) \quad \text{Eq 12}$$

As will be understood by those of skill in the art, the ML detector is optimal and is able to fully exploit the available diversity inherent in the channel matrix H. Thus the ML detector can realize substantial improvements over suboptimal equalization-based detection methods. The disadvantage of the ML detector, however, is that it requires an exhaustive search to find the LLRs of each bit. Moreover, the computational complexity of the ML detector grows exponentially with $N_t$, the number of transmitter antennas.

An initial estimate of the transmitted symbols is be obtained, and is used to reduce the search to N(N<M) symbols that are closest by some criteria to the estimated transmitted symbols and a search is conducted within the reduced search set, with the minimum soft metric for each bit being a 0 or a 1. Various embodiments of the present invention use optimizing criteria for determining the reduced search set in the present invention, as described in U.S. patent application Ser. No. 11/027,106, filed on Dec. 31, 2004, by inventor Min Chuin Hoo, entitled "Reduced Complexity Detector for Multiple-Antenna Systems," which by this reference is incorporated herein for all purposes.

A suboptimal equalization-based detector processes the received symbol vector with an equalizer to separate out the transmit streams and to produce noisy estimates of the transmit symbols. Though suboptimal, it is simple to implement and is likely to work well where the MIMO channels are well-conditioned. A linear equalizer is defined by the following equation:

$$\hat{x} = Q(Wy) \quad \text{Eq 13}$$

where W is the linear equalization matrix and Q(.) denotes the slicing operation according to the constellation used. In an embodiment of the invention, the linear equalization matrix is defined by a Zero-forcing (ZF) equalizer:

$$W = (H^H H)^{-1} H^H \quad \text{Eq 14}$$

which is the pseudo-inverse of H. In this equation, it is assumed that $N_r > N_t$. In another embodiment of the invention, the equalization matrix is defined by a Minimum-mean-squared-error (MMSE) equalizer:

$$W = \left(H^H H + \frac{1}{SNR} I\right)^{-1} H^H \quad \text{Eq 15}$$

In alternative embodiment of the invention, the optimizing criteria comprises nulling and canceling. As opposed to linear equalization where all components are estimated jointly, the nulling and canceling approach estimates the components of the transmit symbol vector sequentially. For example, if the first element of the transmit symbol vector is first estimated using either the ZF or MMSE linear equalization approach, then its contribution to the received vector y is subtracted from y. The modified received vector y is then used for estimating the next element of the transmit symbol vector. The whole process is repeated until all components of the transmit symbol vector have been estimated.

Using the noisy estimates produced by an equalization-based detector, the soft metrics for each transmit bit being a 0 or a 1 can be estimated. Let $b_{l,i}$ be the $l^{th}$ bit that is transmitted on the $i^{th}$ transmit path. In other words, $b_{l,i}$ is the $l^{th}$ bit of the $i^{th}$ element of the transmit symbol vector. The index l goes from 1 to $\log_2(M)$ where M is the size of the constellation The soft metrics for $b_{l,i} = 0, 1$ when an equalization-based detector is used, are given by:

$$m_{l,i} = \frac{\|\hat{x}_i - Q_{bl=0}(\hat{x}_i)\|^2}{\sigma_i^2}$$

$$\overline{m}_{l,i} = \frac{\|\hat{x}_i - Q_{bl=1}(\hat{x}_i)\|^2}{\sigma_i^2}$$

where $Q_{bl=0\ or\ 1}$ denotes slicing to the closest constellation point that has a 0 or 1 in the $l^{th}$ bit position.

As was discussed hereinabove, the present invention provides an adaptive, reduced-complexity MIMO soft-output maximum-likelihood detector 112 (hereinafter, sometimes referred to as "ARML") that selects a processing scheme based on a determination of signal quality. If the signal quality is low, the signal is processed using a maximum likelihood detector using the techniques discussed hereinabove. If, however, the signal quality is high, a simpler sub-optimal detector is used (same changes as those under Summary of Invention). By estimating the signal quality and choosing an appropriate detection method based on the estimated signal quality, the present invention ensures accurate detection of incoming data signals in a MIMO communication system while maintaining the highest possible processing speed.

In one embodiment of the ARML 112 of the present invention, an equalization-based detector is used to separate the transmit streams at the receiver so as to obtain a closed-form representation of the signal quality of each transmit stream. The signal quality of each transmit stream is a function of the signal-to-noise ratio and the modulation format. In an embodiment of the invention, the measurement is based on $d/2\sigma$ where d is the minimum distance between 2 constellation symbols and $\sigma^2$ is the noise power after linear equalization. If the transmit energy is kept constant, the larger the constellation size, the smaller d is. The bigger $d/2\sigma$ is, the higher the signal quality, and the less complex the detection method needs to be. In a multiple-antenna communication system, such as the system shown in FIG. 1, it is necessary to compute $d/2\sigma$ for each transmit stream.

For square-QAM constellations, d can be computed as:

$$d = \sqrt{\frac{E_x \times 12}{M - 1}}$$

where M is the constellation size and Ex is the average energy per dimension.

The table below lists d for 3 well-known square-QAM constellations. Ex is 0.5 which means the average energy is 1.

| Constellation | M | d |
|---|---|---|
| 4-QAM | 4 | 1.4142 |
| 16-QAM | 16 | 0.6325 |
| 64-QAM | 64 | 0.3086 |

If linear equalization methods are used, the noise power after equalization has a closed form representation and, therefore, $d/2\sigma$ can be computed easily. Using $(d/2\sigma)i$, where i denotes the $i^{th}$ transmit stream, an appropriate soft-output detection method can be implemented. The larger $(d/2\sigma)_i$ is, the higher the signal quality, the less complex the detection method needs to be.

As a general illustration, the method discussed above can be understood with reference to a 2×2 MIMO system. First, any linear-equalization-based transmit-symbol estimation method is used to compute $(d/2\sigma)_i$ for each of the 2 transmit paths. Second, based on $(d/2\sigma)_1$ and $(d/2\sigma)_2$, an appropriate detection method is chosen. As will be understood by those of skill in the art, if the modulation format is the same for both transmit paths, only the noise power needs to be calculated since d is the same.

In one embodiment of the invention, the ARML uses the following implementation for adaptively choosing the soft-output detection method:

If $(d/2\sigma)_1$ or $(d/2\sigma)_2$ is greater than 1
    If absolute difference $|(d/2\sigma)_1 - (d/2\sigma)_2| > 0.4$
        Choose a nulling-and-cancelling-based detection method.
    Else
        Choose a linear-equalization-based detection method.
Else if both $(d/2\sigma)_1$ and $(d/2\sigma)_2$ are less than 0.2
    Erasures
Else if $0.2 < ((d/2\sigma)_1$ and $(d/2\sigma)_2) < 0.35$
    Choose the maximum-likelihood-based detection method.
Else
    Choose a reduced-complexity maximum-likelihood-based detection method. Further checks are necessary to choose $N_i$ which is the number of symbols closest by some criteria to the estimated transmit symbol on the $i^{th}$ path. For example, for a 2×2 64-QAM MIMO system,
    If $(d/2\sigma)_i > 0.6$, choose $N_i = 4$
    If $(d/2\sigma)_i > 0.4$, choose $N_i = 8$
    If $(d/2\sigma)_i > 0.2$, choose $N_i = 16$ In another embodiment of the invention, the ARML can be used to process data using OFDM protocols. In an OFDM system, a symbol is made up of sub-symbols where each sub-symbol undergoes linear equalization. Hence, every sub-symbol is associated with $(d/2\sigma)_{i,k}$ where i denotes the transmit stream and k denotes the sub-symbol. The following is an implementation of the processing sequence for the ARML 228 for processing OFDM data:

1. Sort the maximum or minimum of $(d/2\sigma)_i$ for each sub-symbol in an ascending order.
2. Choose the first A sub-symbols for soft-output maximum-likelihood detection.
3. Choose the next B sub-symbols for soft-output reduced-complexity maximum-likelihood detection.
4. Of the remaining sub-symbols, sort the ratio of min(d/2σ)i/max(d/2σ)i in an ascending order. Choose the first C sub-symbols for soft-output nulling-and-cancelling-based detection.
5. For the remaining sub-symbols, choose soft-output linear-equalization-based detection.

In an alternate embodiment, a processing step can be added after step 1 to ignore the first Z sub-symbols, i.e., treat them as erasures. In this embodiment, for the remaining sub-symbols, choose the first A sub-symbols for soft-output maximum-likelihood detection and so forth.

In another embodiment of the adaptive, reduced-complexity soft-output maximum-likelihood detector of the present invention, the signal quality measure can be derived from processing the channel information. The signal quality measure can be but not limited to some function of the singular values of the channel. To obtain the singular values of the channel, singular-value decomposition has to be performed on the channel H. Via singular-value decomposition, H can be represented as $H=USV^H$ where the matrices U and V are unitary matrices and they contain the left and right singular vectors of H respectively, and S is a diagonal matrix that contains the singular values $s_i$ of H. Without loss of generality, let's assume that the singular values $s_i$ are sorted in a non-increasing order. The condition number of channel H, $c_H$ is defined as the ratio of the maximum to minimum singular value. Mathematically, $c_H=s_1/s_{Nt}$ which is always greater than or equal to 1. For an ill-conditioned channel, $c_H$ is large. Ideally, $c_H$ should be 1. As mentioned before, while the optimum maximum-likelihood detector is robust to ill-conditioned channels, the performance of a sub-optimal detector depends strongly on the conditioning of the channel. Therefore, we propose the condition number of the channel, or the maximum, minimum singular value of the channel as good candidates to be signal quality measures. In an OFDM system, each sub-symbol will experience a different H. Hence, singular-value decomposition will have to be performed on the H for each sub-symbol to produce the signal quality measure based on the singular values of H.

The following is an implementation of the processing sequence for the ARML 228 for processing OFDM data:

1. Sort the maximum or minimum singular value of $H(s)_i$ for each sub-symbol in an ascending order.
2. Choose the first A sub-symbols for soft-output maximum-likelihood detection.
3. Choose the next B sub-symbols for soft-output reduced-complexity maximum-likelihood detection. (reference BP4054)
4. Of the remaining sub-symbols, sort the inverse of the condition numbers (ratio of min(s)i/max(s)i in an ascending order. Choose the first C sub-symbols for soft-output nulling-and-cancelling-based detection.
5. For the remaining sub-symbols, choose soft-output linear-equalization-based detection.

In an alternate embodiment, a processing step can be added after step 1 to ignore the first Z sub-symbols, i.e., to treat them as erasures. Then, for the remaining sub-symbols, choose the first A sub-symbols for soft-output maximum-likelihood detection and so forth. Those skilled in the art should appreciate that the list of detectors that can be used is not exhaustive here and that the algorithm can be made simpler by having a smaller list of detectors to choose from.

Instead of using the maximum or minimum or ratio of singular values in step 1 above, one can also compute the average of the maximum or minimum or ratio of singular values across all sub-symbols. Depending on how far the maximum or minimum or ratios of singular values diverge from the mean, the appropriate soft-output detector can be used.

The soft-output maximum-likelihood detector is the optimal detector as it utilizes all available diversity in a MIMO channel. However, it is not a practical scheme since its complexity grows exponentially with the number of transmit antennas. The much simpler but sub-optimal detection methods may perform just as well as the maximum-likelihood detector under the right conditions.

As can be seen from the foregoing discussion, the method and apparatus of the present invention provides an adaptive reduced-complexity maximum-likelihood detector that provides a high degree of signal detection accuracy while maintaining high processing speeds. Those of skill in the art will appreciate that the teachings of the present invention can be modified by using different schemes and the invention can be applied to any communication system with multiple transmit streams.

Although the present invention has been described in detail, it should be understood that various changes, substitutions and alterations can be made hereto without departing from the spirit and scope of the invention as defined by the appended claims.

What is claimed is:

1. A communication system, comprising:
a plurality of transmit sources operable to transmit a plurality of symbols over a plurality of channels;
an adaptive detector operable to:
    receive a plurality of symbols corresponding to said plurality of transmitted symbols;
    measure the signal quality of said plurality of symbols;
    implement a detection process based on said measurement of signal quality; and
    use said detection process to generate decisions for detecting said plurality of transmitted symbols;
    wherein said detector comprises an equalization-based detector operable to process said plurality of symbols transmitted over a well-conditioned channel; and
    wherein said detector further operable to:
        process said received symbols to obtain initial estimates of said transmitted symbols;
        use said initial estimates to generate a plurality of reduced search sets; and
        use said reduced search set to generate said decisions for detecting said transmitted symbols;
    wherein said reduced search set is obtained by:
        (a) finding the eligible constellation points corresponding to each noisy estimated transmit symbol, thereby defining a reduced search set for the transmitted symbol vector; and (b) searching over the reduced set for the transmit symbol vector that minimizes $\|y-Hx\|^2$, thereby generating an estimate of the transmitted symbol.

2. The communication system of claim 1, wherein said initial estimate is obtained by linear equalization of said received symbols.

3. The communication system of claim 2, wherein said linear equalization is obtained by using a zero-forcing factor.

4. The communication system of claim 2, wherein said linear equalization is obtained by using a minimum-mean-squared-error equalizer.

5. The communication system of claim 2, wherein said initial estimate is obtained by nulling and canceling of data corresponding to said received signals.

6. The communication system of claim 5, wherein said reduced search set is obtained by equalizing a vector of received symbols to obtain noisy estimates thereof and slicing said noisy estimates to a set of eligible constellation points.

7. The communication system of claim 1, wherein said estimate is correlated with a candidate transmitted symbol to generate a data output corresponding to said transmitted symbol.

8. The communication system of claim 7, wherein said data output corresponding to said transmitted symbol is generated using a log-likelihood probability ratio.

9. A method of communicating data, comprising:
transmitting a plurality of symbols over a plurality of channels;
receiving and processing said plurality of symbols corresponding to said plurality of transmitted symbols using an adaptive detector operable to:
measure the signal quality of said plurality of symbols;
implement a detection process based on said measurement of signal quality; and
use said detection process to generate decisions for detecting said plurality of transmitted symbols;
wherein said detector comprises an equalization-based detector operable to process said plurality of symbols transmitted over a well-conditioned channel;
wherein said detector is further operable to:
process said received symbols to obtain initial estimates of said transmitted symbols;
use said initial estimates to generate a plurality of reduced search sets; and
use said reduced search set to generate said decisions for detecting said transmitted symbols; and
wherein said reduced search set is obtained by:
(a) finding the eligible constellation points corresponding to each noisy estimated transmit symbol, thereby defining a reduced search set for the transmitted symbol vector; and
(b) searching over the reduced set for the transmit symbol vector that minimizes $\|y-Hx\|^2$, thereby generating an estimate of the transmitted symbol.

10. The method of claim 9, wherein said initial estimate is obtained by linear equalization of said received symbols.

11. The method of claim 10, wherein said linear equalization is obtained by using a zero-forcing factor.

12. The method of claim 10, wherein said linear equalization is obtained by using a minimum-mean-squared-error equalizer.

13. The method of claim 10, wherein said initial estimate is obtained by nulling and canceling of data corresponding to said received signals.

14. The method of claim 13, wherein said reduced search set is obtained by a equalizing a vector of received symbols to obtain noisy estimates thereof and slicing said noisy estimates to a set of eligible constellation points.

15. The method of claim 9, wherein said estimate is correlated with a candidate transmitted symbol to generate a data output corresponding to said transmitted symbol.

16. The method of claim 15, wherein said data output corresponding to said transmitted symbol is generated using a log-likelihood probability ratio.

* * * * *